US007860025B2

(12) United States Patent
Thubert et al.

(10) Patent No.: US 7,860,025 B2
(45) Date of Patent: Dec. 28, 2010

(54) DIRECTED ACYCLIC GRAPH DISCOVERY AND NETWORK PREFIX INFORMATION DISTRIBUTION RELATIVE TO A CLUSTERHEAD IN AN AD HOC MOBILE NETWORK

(75) Inventors: Pascal Thubert, La Colle sur Loup (FR); Patrick Wetterwald, Mouans Sartoux (FR); Vincent Jean Ribiere, Biot (FR)

(73) Assignee: Cisco Technology, Inc., San Jose, CA (US)

( * ) Notice: Subject to any disclaimer, the term of this patent is extended or adjusted under 35 U.S.C. 154(b) by 1145 days.

(21) Appl. No.: 11/167,240

(22) Filed: Jun. 28, 2005

(65) Prior Publication Data

US 2006/0291404 A1 Dec. 28, 2006

(51) Int. Cl.
*H04L 12/26* (2006.01)
(52) U.S. Cl. .................. 370/254; 370/310; 370/349; 709/238
(58) Field of Classification Search ............... 370/389, 370/392, 254–256, 338, 400–401; 709/238, 709/242
See application file for complete search history.

(56) References Cited

U.S. PATENT DOCUMENTS

| | | | | |
|---|---|---|---|---|
| 5,251,205 A | * | 10/1993 | Callon et al. | 370/392 |
| 5,881,246 A | * | 3/1999 | Crawley et al. | 709/238 |
| 6,865,184 B2 | | 3/2005 | Thubert et al. | |
| 7,006,453 B1 | * | 2/2006 | Ahmed et al. | 370/255 |
| 2002/0141346 A1 | * | 10/2002 | Garcia-Luna-Aceves et al. | 370/238 |
| 2003/0202465 A1 | * | 10/2003 | Cain | 370/225 |
| 2004/0032852 A1 | * | 2/2004 | Thubert et al. | 370/349 |
| 2004/0081152 A1 | | 4/2004 | Thubert et al. | |
| 2005/0265259 A1 | | 12/2005 | Thubert et al. | |

(Continued)

FOREIGN PATENT DOCUMENTS

EP 1 324 532 A2 7/2003
WO WO 2005/010214 A2 2/2005

OTHER PUBLICATIONS

Badache et al., "Le routage dans les réseaux mobiles ad hoc", *Ministère De L'Enseignement Supérieur Et De La Recherche Scientifique*, Sep. 2000, <http://opera/inrialpes.fr/people/Tayeb.Lemlouma/Papers/AdHocRouting.pdf>.

(Continued)

*Primary Examiner*—Chirag G Shah
*Assistant Examiner*—Salvador E Rivas
(74) *Attorney, Agent, or Firm*—Leon R. Turkevich

(57) ABSTRACT

Each mobile router in an ad hoc mobile network is configured for concurrently attaching to multiple parents advertising respective parent depths relative to a clusterhead of the ad hoc mobile network. The mobile router selects an advertised depth relative to the clusterhead based on adding a prescribed increment to a maximum one of the parent depths, enabling the mobile routers to form a directed acyclic graph relative to the clusterhead. Each mobile router sends to each of its parents a neighbor advertisement message specifying at least one reachable prefix, a corresponding cost for reaching the reachable prefix, and a corresponding sequence identifier that enables the parents to validate the neighbor advertisement message relative to stored router entries. Hence, mobile routers automatically can form a directed acylic graph relative to the clusterhead, and can distribute routing information with minimal overhead.

50 Claims, 7 Drawing Sheets

U.S. PATENT DOCUMENTS

2006/0010249 A1* 1/2006 Sabesan et al. ............. 709/238
2006/0101157 A1* 5/2006 Eardley ...................... 709/239
2006/0133328 A1* 6/2006 Levendel et al. ............ 370/338
2006/0227724 A1 10/2006 Thubert et al.
2006/0291485 A1 12/2006 Thubert et al.

OTHER PUBLICATIONS

U.S. Appl. No. 10/856,809, filed Jun. 1, 2004, Thubert et al.

Ernst et al., "Network Mobility Support Terminology" <draft-ernst-monet-terminology-00.txt> IETF Internet Draft. Feb. 2002.

Baker, "An outsider's view of MANET" <draft-baker-manet-review-01> Network Working Group Internet Draft, Mar. 17, 2002.

Moy, "OSPF Version 2", Network Working Group Request for Comments: 2178, Jul. 1997.

Perkins et al., "Ad hoc On-Demand Distance Vector (AODV) Routing" <draft-ietf-manet-aodv-13.txt> Mobile Ad Hoc Networking Working Group Internet Draft.

Johnson et al., "The Dynamic Source Routing Protocol" <draft-ietf-manet-dsr-09.txt> IETF MANET Working Group Internet Draft, Apr. 15, 2003.

Garcia-Luna-Aceves et all, "Source Tree Adaptive Routing (STAR) Protocol" <draft-ietf-manet-star-00.txt> IETF MANET Working Group Internet Draft, Oct. 22.

Park et al., "A Highly Adaptive Distributed Routing Algorithm for Mobile Wireless Networks", Proceedings of IEEE INFOCOM '97, (1997).

Park et al., "A Highly Adaptive Distributed Routing Algorithm for Mobile Wireless Networks", Proceedings of IEEE INFOCOM '97, (1997) (Powerpoint Presentation by Xin Zhang).

Thubert et al. "Nested Nemo Tree Discovery" <draft-thubert-tree-discovery-01.txt> NEMO Working group Internet Draft, Oct. 11, 2004.

Perkins, ed., *Ad Hoc Networking*, 2001, pp. 255-298, Addison-Wesley, USA.

* cited by examiner

DIRECTED ACYCLIC GRAPH DISCOVERY AND NETWORK PREFIX INFORMATION DISTRIBUTION RELATIVE TO A CLUSTERHEAD IN AN AD HOC MOBILE NETWORK

BACKGROUND OF THE INVENTION

1. Field of the Invention

The present invention relates to routing protocols for establishment of an ad hoc mobile network by mobile routers, where the routing protocols are optimized for minimal overhead for accommodating rapid topology changes in the ad hoc mobile network.

2. Description of the Related Art

Proposals have been made by Internet Engineering Task Force (IETF) groups for improved mobility support of Internet Protocol (IP) based mobile devices (e.g., laptops, IP phones, personal digital assistants, etc.) in an effort to provide continuous Internet Protocol (IP) based connectivity. The IETF has a Mobile IP Working Group that has developed routing support to permit IP nodes (hosts and routers) using either IPv4 or IPv6 to seamlessly "roam" among IP subnetworks. In addition, the Mobile Networks (MONET) group (renamed as the Network Mobility (NEMO) group) has published different Internet Drafts, including an Internet Draft by Thierry Ernst, entitled "Network Mobility Support Terminology", February 2002.

According to the NEMO group, a mobile network may be composed by one or more IP subnets and is connected to the global Internet via one or more Mobile Routers (MR). The mobile router has at least two network interfaces: an egress interface toward the wide area network, and an ingress interface from within the mobile network. Mobile network nodes may include local fixed nodes (LFN) (nodes unable to change their point of attachment while maintaining ongoing sessions), local mobile nodes (LMN) (mobile nodes that belong to the mobile network and able to change their point of attachment within the mobile network or outside the mobile network), and visiting mobile nodes (VMN) (mobile nodes that not belong to the mobile network and that can change their point of attachment from outside the mobile network to inside the mobile network). Each of the nodes may be either a host or a router.

Hence, a mobile router is a router configured for establishing a communication link between the mobile network and an attachment router. As apparent from the foregoing, an objective of NEMO is providing mobile nodes with protocols for establishing connectivity with a wide area network, such as the Internet. The mobile router thus serves as a gateway to route packets between the mobile network and the Internet.

Unfortunately, existing Internet-based routing protocols that assume a persistent connection to a wide area network such as the Internet rely on the ability to aggregate reachability to IP nodes, where all nodes sharing a common network link (such as a link of a top level mobile router connecting to an attachment router on the Internet) share the same routing prefix. Such aggregation creates a hierarchy of network prefixes that enables scalability. However, such a hierarchy is not possible in ad hoc networks.

The IETF has a Mobile Ad-hoc Networks (MANET) Working Group that is working to develop standardized MANET routing specification(s) for adoption by the IETF. According to the MANET Working Group, the "mobile ad hoc network" (MANET) is an autonomous system of mobile routers (and associated hosts) connected by wireless links—the union of which form an arbitrary graph. The routers are free to move randomly and organize themselves arbitrarily; thus, the network's wireless topology may change rapidly and unpredictably. Such a network may operate in a standalone fashion, or may be connected to the larger Internet.

The MANET system is particularly suited to low-power radio networks that may exhibit an unstable topology, where wireless propagation characteristics and signal quality between a wireless transmission source and a receiver can be difficult to model and quantify. In a MANET, the device address is tied to the device, not a topological location, as there is no fixed network infrastructure. When the addressed device moves, therefore, the motion changes the routing infrastructure. Hence, as described in an Internet Draft by Baker, entitled "An Outsider's View of MANET" (Mar. 17, 2002), the fundamental behavior of a MANET is that a routing node carries with it an address or address prefix, and when it moves, it moves the actual address; when this happens, routing must be recalculated in accordance with the new topology. For example, each mobile router retains its address prefix; hence, neighboring mobile routers in a MANET may have distinct address prefixes.

Existing MANET protocols focus on the internal connectivity within the unstable topology between mobile devices; however, the existing MANET protocols suffer from the disadvantage that they provide a poor model for connecting to a wide area network such as the Internet.

MANET protocols can be divided into the following types: stateful (proactive); and stateless (reactive). Proactive MANET protocols distribute routing information throughout the MANET network, enabling the routers within the MANET network to store route information before a data packet needs to be routed; hence, a router determines how to forward a packet based on accessing routing information from an internal table. However, proactive protocols suffer the disadvantage of requiring update messages to update obsolete route entries: the necessity for update messages increases with a corresponding desire for an improvement in route optimization.

Proactive MANET protocols can be subdivided into two subtypes, or "families": Optimized Routing Approach (ORA), and Least Overhead Routing Approach (LORA). The ORA type protocols are similar to routing protocols used in the Internet, in that they stress maintaining the best states to maintain the shortest path routes, at the expense of requiring more control messages to exchange routes. An example of an ORA type routing protocol is Open Shortest Path First (OSPF) (as specified by the IETF Request for Comments (RFC) 2178), or Intermediate System-to-Intermediate System (IS-IS) protocol (specified by the International Organization for Standardization document ISO 10589). However, the OSPF and IS-IS protocols suffer from the disadvantage that they may require up to a minute to converge (i.e., complete protocol communications necessary to establish a connection) and hence may not be able to converge quickly enough for a mobile router that is moving from one location to another. For example, in the case of two vehicles passing each other, each having a mobile router, there may exist approximately ten seconds for the mobile routers to establish a connection; hence, routing protocols requiring up to a minute to converge would be unable to establish a connection. Also note that OSPF requires link-state advertisements (LSAs) to be refreshed as they expire after 3600 sec, resulting in substantial burdens in distributing the LSAs.

Reactive protocols were developed to address the slow convergence of ORA type proactive protocols, where routing information is acquired only when needed. Examples of reactive protocols are described in an Internet Draft by Perkins et al., "Ad hoc On-Demand Distance Vector (AODV) Routing (draft-ietf-manet-aodv.13), Feb. 17, 2003, and an Internet Draft by Johnson et al., "The Dynamic Source Routing Protocol for Mobile Ad Hoc Networks (DSR) <draft-ietf-manet-dsr-09.txt>", Apr. 15, 2003. Reactive protocols require less bandwidth than proactive protocols, but the latency for many applications will increase substantially, resulting in long delays. Such delays become quite apparent if a mobile user attempts to execute a bandwidth-intensive application on the ad hoc network instead of a typical high-speed wired connection on the Internet using a conventional connection (e.g., hard-wired LAN, cable modem, etc.).

The LORA family of proactive protocols attempts to provide a compromise between the fully stateful (ORA family) protocols and the fully stateless (reactive) protocols. One example of a LORA-type protocol is described in an Internet Draft by Garcia-Luna-Aceves, et al., "Source Tree Adaptive Routing (STAR) Protocol <draft-ietf-manet-star.00.txt>", Oct. 22, 1999. However, even the disclosed STAR protocol suffers from disadvantages of requiring routing messages to establish a stable topology within the MANET network. For example, the STAR protocol requires a router to transmit the parameters of its source routing tree, including each link that the router needs to reach every known destination (and address range) in the ad hoc network or Internet. Although the STAR router attempts to conserve transmission bandwidth and energy by sending changes to its source routing tree only when the router detects new destinations, the possibility of looping, or the possibility of node failures or network partitions, the necessity of transmitting such parameters for each and every link still imposes substantial messaging requirements that affects bandwidth availability and network convergence times.

Hence, existing LORA-type protocols still provide only limited improvements in reducing convergence time and update messages between routers.

Efforts have been made to optimize communications between mobile routers of an ad hoc network based on the mobile routes organizing into a tree-based topology. For example, U.S. Patent Publication No. US 2004/0032852, published Feb. 19, 2004, entitled "Arrangement for Router Attachments Between Roaming Mobile Routers in a Mobile Network", the disclosure of which is incorporated in its entirety herein by reference, describes a technique for each mobile router of an ad hoc mobile network to independently select whether to attach to a candidate attachment router, based on tree information options advertised by the candidate attachment router and selection criteria employed by the mobile router. The independent selection by each router of whether to attach to another router enables the routers to dynamically establish a tree-based network topology model, where each router may continually determine whether an alternate attachment point within the tree is preferred.

Commonly-assigned, copending application Ser. No. 10/856,809, filed Jun. 1, 2004, entitled "Arrangement for Providing Network Prefix Information from Attached Mobile Routers to a Clusterhead in a Tree-Based Ad Hoc Mobile Network", the disclosure of which is incorporated in its entirety herein by reference, describes a technique that provides optimized transfer of routing information between mobile routers having established a tree topology in an ad hoc mobile network. The tree-based network topology has a single clusterhead and attached mobile routers. Each attached mobile router has a default egress interface configured for sending messages toward the clusterhead, and ingress interfaces configured for receiving messages from attached network nodes that are away from the clusterhead. A neighbor advertisement message received from an ingress interface away from a clusterhead is used by the attached mobile router to identify specified network prefixes that are reachable via the source of the neighbor advertisement message. The attached mobile router outputs on its default upstream interface a second neighbor advertisement message that specifies the network prefix used by the attached mobile router, and the specified network prefixes from the neighbor advertisement message received on the ingress interface. Hence, the propagation of neighbor advertisement messages toward the clusterhead establishes connectivity with minimal routing overhead.

Concerns remain, however, that mobile ad hoc networks continually encounter changes in communications links that may cause regular and unpredictable changes in the network topology: any connectivity loss between a mobile router and its attachment router requires the mobile router to locate a new attachment router, and communicate to the clusterhead the change in network topology, namely that the mobile router and its subtree are now reachable via the new attachment router.

Link reversal routing has been suggested as a technique for providing multiple communications links between nodes in an ad hoc mobile network, where link reversal routing algorithms build a directed acyclic graph (DAG) for each possible destination: a directed graph is acyclic if it contains no cycle or loop, and the DAG maps to a given destination based on the destination having only incoming links: all other nodes that have incoming links also must have outgoing links. An example of a routing algorithm that builds a DAG is the Temporally-Ordered Routing Algorithm (TORA).

Existing DAQ-based routing algorithms that permit multiple connections, such as TORA, still require substantial processing and overhead requirements that may increase convergence times in response to topology changes, limiting the ad hoc network to rapidly respond to topological changes. For example, reliance on a DAG for a given destination requires recalculation of a new DAG for each and every destination; further, TORA requires that a packet is broadcast to all of its neighbors, resulting in additional congestion in the ad hoc network and additional processing by each network node that receives a packet and determines that the packet should be dropped.

SUMMARY OF THE INVENTION

There is a need for an arrangement that enables a mobile ad hoc network to employ the benefits of minimal processing requirements associated with tree-based routing protocols, while accommodating multiple-path connections for reliable data transfer and load balancing between endpoints in a mobile ad hoc network.

There also is a need for an arrangement that enables mobile routers of a mobile ad hoc network to optimize communications with a clusterhead based on organizing into a network topology in accordance with a directed acyclic graph (DAG), where mobile routers can have multiple attachment routers (also referred to as "parents") with minimal processing requirements for establishment and maintenance of the network topology.

These and other needs are attained by the present invention, where each mobile router in an ad hoc mobile network is configured for concurrently attaching to multiple parents advertising respective parent depths relative to a clusterhead of the ad hoc mobile network. The mobile router, in response to attaching to the multiple parents, selects an advertised depth relative to the clusterhead based on adding a prescribed increment to a maximum one of the parent depths, enabling the mobile routers to form a directed acyclic graph relative to the clusterhead. Each mobile router also is configured for sending to each of its parents a neighbor advertisement message specifying at least one reachable prefix, a corresponding cost for reaching the reachable prefix, and a corresponding sequence identifier that enables the parents to validate the neighbor advertisement message relative to stored router entries.

Hence, the mobile routers automatically can form a directed acyclic graph relative to the clusterhead, and can propagate reachable prefixes to each of their respective parents, enabling all the mobile routers and the clusterhead to distribute routing information with minimal overhead.

One aspect of the present invention provides a method in a mobile router configured for establishing communications within an ad hoc network. The method includes establishing concurrent attachments to respective attachment routers based on having received respective advertisement messages specifying respective parent depths relative to a clusterhead of the ad hoc network. The method also includes selecting an advertised depth relative to the clusterhead based on adding a prescribed increment to a maximum one of the parent depths, and advertising reachability to the clusterhead based on outputting a router advertisement message specifying the advertised depth relative to the clusterhead. Attaching to a plurality of attachment routers enables the mobile router to establish stable connectivity within the ad hoc mobile network, ensuring connectivity if the link to one of the attachment routers is lost; multiple attachments also enables the mobile router to distribute traffic via the respective attachment routers for load balancing. Further, the selection of an advertised depth enables the mobile router to position itself within the mobile network topology as desired, for example enabling mobile routers configured as backbone routers to position themselves closer to the clusterhead, whereas mobile routers configured as distribution routers can position themselves further from the clusterhead and closer to end nodes at the periphery of the ad hoc network. Hence, multiple unequal-cost paths can be directed toward the clusterhead, enabling the mobile routers to establish a directed acyclic graph toward the clusterhead, providing a more stable network topology within the ad hoc network.

An additional feature of this aspect includes sending, by the mobile router to each of the attachment routers and in response to having established each corresponding attachment, a neighbor advertisement message specifying at least one reachable prefix advertised by the mobile router in the router advertisement message, a corresponding cost for reaching the reachable prefix, and a corresponding sequence identifier that enables validation of the corresponding at least one reachable prefix relative to any stored router entries in the attachment routers. Hence, mobile routers can distribute routing information toward the clusterhead via multiple paths in the ad hoc network, enabling the attachment routers and the clusterhead to identify the most recent routing information for reaching the reachable prefixes.

Another aspect of the present invention provides an ad hoc network having a plurality of mobile routers. The plurality of mobile routers have organized into a directed acyclic graph directed toward a clusterhead, one of the mobile routers serving as the clusterhead and the directed acyclic graph having attached mobile routers having attached to attachment routers. Each mobile router includes an attachment resource and a router advertisement resource. The attachment resource is configured for selectively establishing concurrent attachments, as an attached mobile router, to selected ones of the attachment routers based on the mobile router having received respective advertisement messages from the selected ones of the attachment routers, the advertisement messages specifying respective parent depths relative to a clusterhead of the ad hoc network. The router advertisement resource is configured for advertising reachability to the clusterhead based on outputting a router advertisement message specifying an advertised depth relative to the clusterhead, the router advertisement resource configured for selecting the advertised depth relative to the clusterhead based on adding a prescribed increment to a maximum one of the parent depths.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1A:
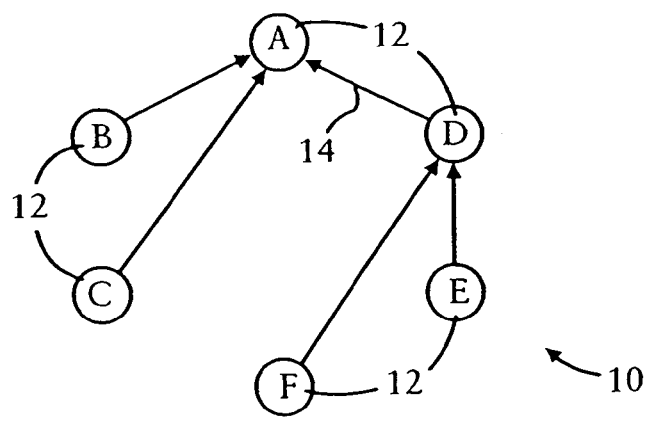
FIGS. 1A, 1B and 1C are diagrams illustrating a mobile ad hoc network having multiple mobile routers connected to a clusterhead according to a tree-based topology, a directed acyclic graph topology according to an embodiment of the present invention, and a reverse graph enabling attachment routers to reach attached routers according to an embodiment of the present invention, respectively.

FIG. 1A is a diagram illustrating an ad hoc network having mobile routers 12 arranged according to a tree topology 10, as described in the U.S. Patent Publication No. US 2004/0032852 and the above-incorporated application Ser. No. 10/856,809. In particular, the tree topology 10 requires that each mobile router 12 can connect to only one attachment router (e.g., the clusterhead "A") at any time. The ad hoc network of FIG. 1A has the advantage of rapid convergence based on minimal overhead, however a loss of connectivity between any two mobile routers 12, for example between routers "A" and "D" due to disruption in a link 14, requires a reconfiguration of the tree-based ad hoc mobile network 10 in order to enable the mobile routers "D", "E", and "F" to restore connectivity with the clusterhead "A".

Figure 1B:
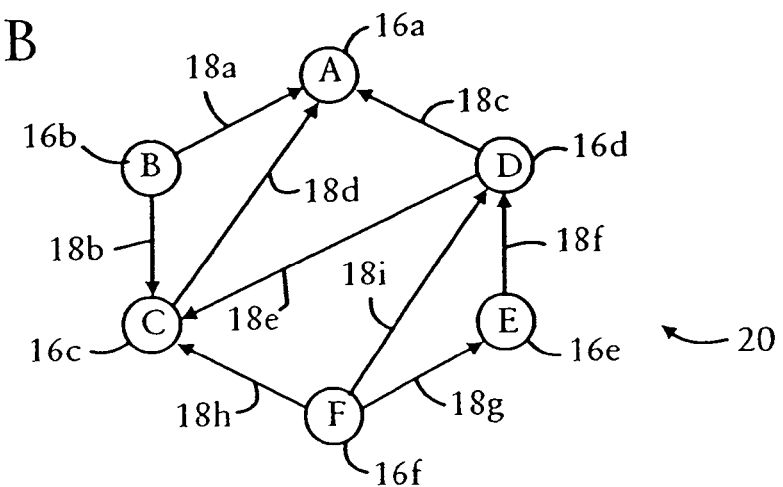

As illustrated in FIG. 1B, the disclosed embodiment is considered an improvement over the tree-based ad hoc network 10, in that mobile routers 16 (e.g., 16a, 16b, 16c, 16d, 16e, and 16f) can establish concurrent attachments with multiple attachment routers using available links 18, enabling the mobile routers 16b, 16c, 16d, 16e, and 16f to establish a directed acyclic graph 20, relative to the clusterhead 16a, that provides stable connectivity based on utilizing multiple links 18 in the ad hoc network. For example, the mobile router "B" 16b can reach the clusterhead "A" 16a by attaching directly to the clusterhead 16a via link 18a, or by attaching to the mobile router "C" 16c via link 18b, where the mobile router "C" 16c has attached to the clusterhead 16a via link 18d. As illustrated in FIG. 1B, the mobile router "D" 16d has multiple concurrent attachments toward the clusterhead 16a via links 18c and 18e, and mobile router "F" 16f also has multiple concurrent attachments toward the clusterhead via links 18g, 18h, and 18i.

Hence, a loss of a single link (e.g., 18c) by a mobile router (e.g., 16d) is inconsequential if the mobile router has at least a second link (e.g., 18e) with another attachment router that can be used for communications toward the clusterhead. Further, use of multiple links by a mobile router 16 enables load sharing of network traffic toward the clusterhead between a mobile router and multiple attachment routers. Hence, the use of multiple unequal-cost paths enables a more stable network topology within the ad hoc network, even if individual links may be lost in the layer 2 mesh network. A description of the establishment of the directed acyclic graph (DAG) 20 by the mobile routers 16 is described below with respect to FIGS. 2-4.

Figure 1C:
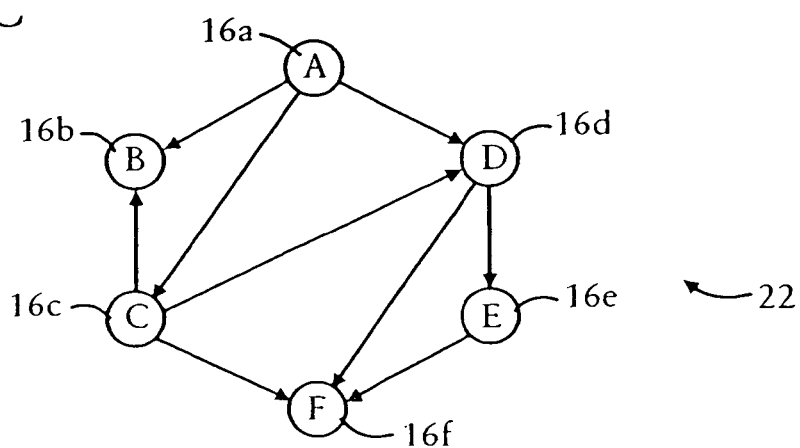

In addition, the disclosed embodiment provides an improvement over the neighbor discovery messages described in the above-incorporated application Ser. No. 10/856,809 by enabling the neighbor discovery messages to be sent from mobile routers 16b, 16c, 16d, 16e, and 16f via the multiple attachment routers toward the clusterhead 16a. Each mobile router 16 identifies an adjacently-reachable mobile router as an attached mobile router (i.e., a child router), or an attachment mobile router (i.e., a parent router); consequently, each mobile router 16 is able to determine whether an advertised network prefix is reachable via a parent router or a child router, enabling each router in the path to route a packet accordingly. Hence, the attachment routers are able to obtain the neighbor discovery messages via all available paths 18, enabling the construction of a reverse graph 22, illustrated in FIG. 1C, that enables the clusterhead 16a to reach mobile routers (e.g., 16f) that are furthest from the clusterhead. A description of the forwarding of routing information via neighbor discovery messages is described below with respect to FIGS. 2 and 5-7.

Figure 2:
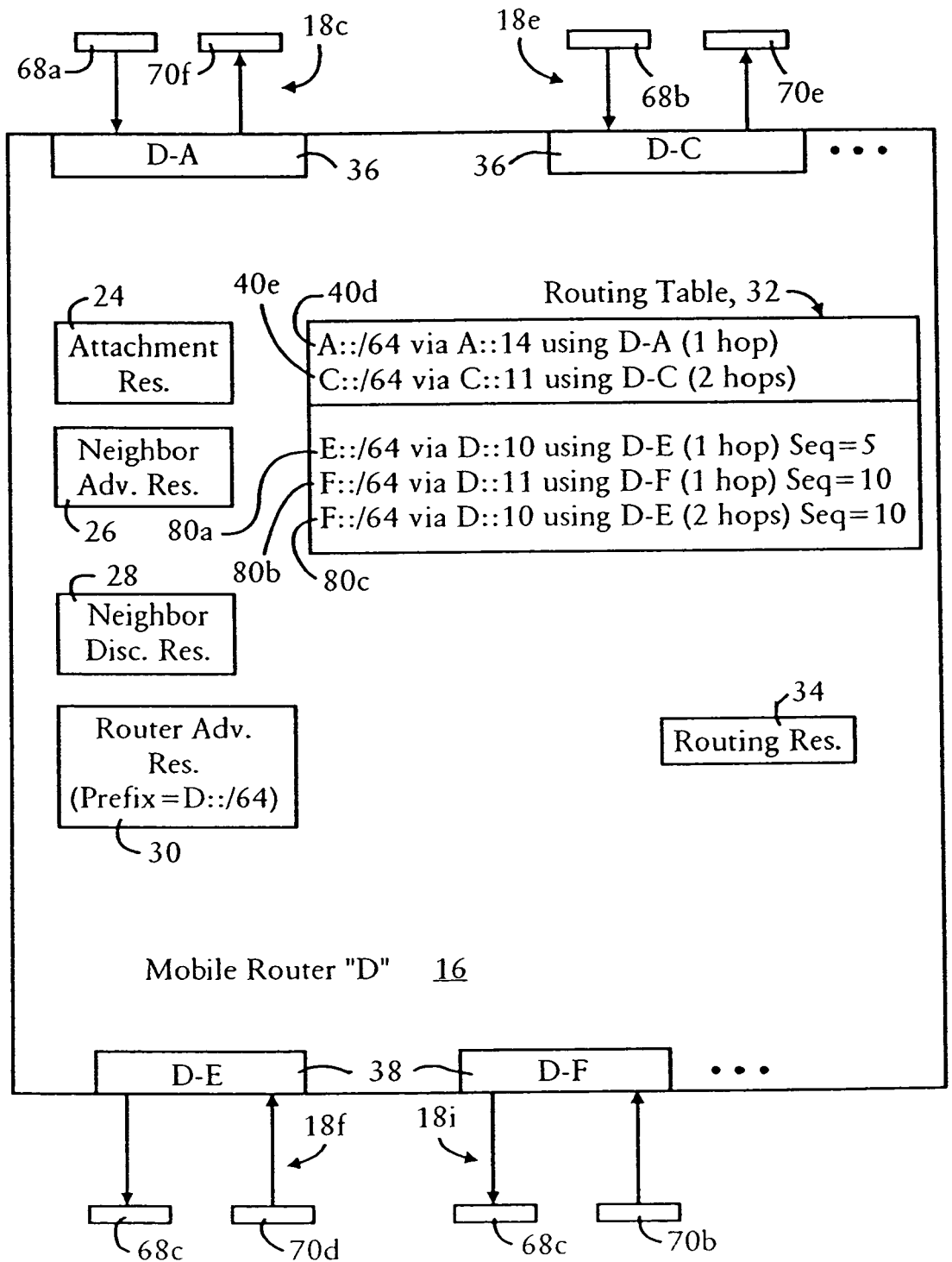
FIG. 2 is a diagram illustrating one of the mobile routers of FIGS. 1B and 1C, respectively.

FIG. 2 is a diagram illustrating one of the mobile routers 16 (e.g., 16d), according to an embodiment of the present invention. The mobile router 16 includes an attachment resource 24, a neighbor advertisement resource 26, a neighbor discovery resource 28, a router advertisement resource 30, a routing table 32, and a routing resource 34. FIG. 2 also provides a logical illustration of egress ports 36 used by the mobile router for attaching to attachment routers based on received router advertisement messages 68 (e.g., 68a, 68b), and transmitting neighbor discovery messages 70 (e.g., 70e and 70f); the mobile router 16 also logically includes ingress ports 38 used by the mobile router 16 for communicating with attached routers by sending router advertisement messages 68c and receiving neighbor discovery messages 70 (e.g., 70b and 70d). The term "logical" refers to a mapping by the mobile router 16 between a network address (e.g., "D::10") and a physical layer connection between a source node and destination node (e.g., physical output port, wireless link identifier, etc.) illustrated in the Figures by the double letter designation for source node to destination node (e.g., "D-E" for a link 18f connecting mobile routers 16d and 16e).

The attachment resource 24 is configured for receiving router advertisement messages (e.g., 68a, 68b) and selectively attaching with at least one attachment router. As described in the above-incorporated applications (U.S. Patent Publication No. US 2004/0032852 and the above-incorporated application Ser. No. 10/856,809), the router advertisement resource 30 in each mobile router is configured for outputting an unsolicited router advertisement message 68 that specifies a prescribed address prefix used by the router outputting the router advertisement message; for example, the mobile routers 16a, 16b, 16c, 16d, 16e, and 16f will send out router advertisement messages 68 specifying their respective hexadecimal address prefixes "A::/64", "B::/64", "C::/64", "D::/64", "E::/64", and "F::/64". Hence, the attachment resource 24 of any mobile router that wishes to attach to any one of the mobile routers 16a, 16b, 16c, 16d, 16e, and 16f will select a corresponding attachment address within the address prefix advertised by the attachment router. For example, the attachment resource 24 of FIG. 2 may select the attachment address "A::14" in response to the router advertisement message 68a advertising the address prefix "A::/64" in order to attach to the mobile router 16a, and the attachment address "C::11" in order to attach to the mobile router 16c in response to the router advertisement message 68b advertising the address prefix "C::/64". The attachment resource 24 completes the attachment to the corresponding attachment router by adding egress routing table entries 40d and 40e, also referred to as default route adjacency entries, to the routing table 32. As described below, each default route adjacency entry 40d and 40e in the routing table 32 specifies a default route toward the clusterhead 16a based on a corresponding adjacency established with a next-hop router (16a for entry 40d, and 16c for entry 40e). Also as described below, each default route adjacency entry 40d and 40e does not specify the number of hops to the corresponding parent router because it is a next-hop router; rather, the entries 40d and 40e specify the number of hops to the clusterhead.

Figure 3:
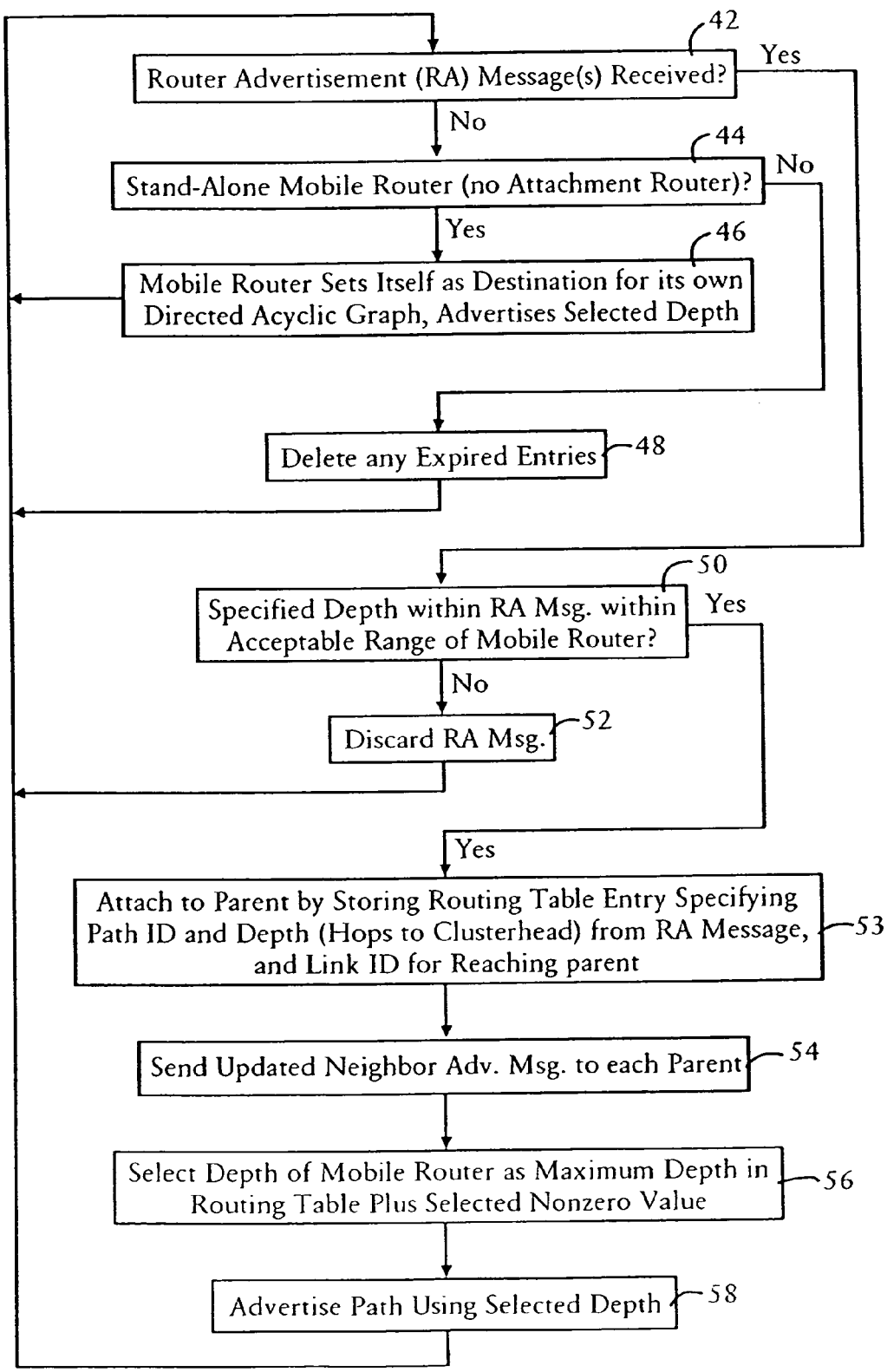
FIG. 3 is a diagram illustrating the method of performing directed acyclic graph discovery by each of the mobile routers of FIG. 1B, according to an embodiment of the present invention.

FIG. 3 is a diagram illustrating the method by the attachment resource 24 and the router advertisement resource 30 for attaching to multiple attachment routers based on received router advertisement messages (e.g., 68a, 68b), and advertising router advertisement messages (e.g., 68c), according to an embodiment of the present invention. The steps described in FIG. 3 (and FIG. 6, described below) can be implemented as executable code stored on a computer readable medium (e.g., a hard disk drive, a floppy drive, a random access memory, a read only memory, an EPROM, a compact disk, etc.), or propagated via a computer readable medium (e.g., a transmission wire, an optical fiber, a wireless transmission medium utilizing an electromagnetic carrier wave, etc.).

If in step 42 the attachment resource 24 does not detect any router advertisement messages 68 within a prescribed time interval, and if the mobile router has an existing attachment router in step 44, the attachment resource 24 checks for any expired default route adjacency entries 40 in the routing table 32, and deletes any expired entries in step 48 accordingly. If in step 44 the attachment resource 24 determines that it is a stand-alone mobile router due to the absence of any attachment router (e.g., no default route adjacency entry 40 in the routing table 32), the attachment resource 24 notifies in step 46 the router advertisement resource 30 to set itself as a destination for its own directed acyclic graph, and to advertise its own selected depth. Hence, the router advertisement resource 30 will advertise the prefix utilized by the mobile router (e.g., "D::/64" for mobile router 16d), plus the selected depth. Additional details relating to router advertisement messages can be obtained from the above-incorporated applications (U.S. Patent Publication No. US 2004/0032852 and the above-incorporated application Ser. No. 10/856,809).

Assuming in step 42 that the attachment resource 24 detects a received router advertisement message (e.g., 68a or 68b), the attachment resource 24 determines in step 50 whether the specified depth in the router advertisement message (e.g., 68a, 68b) is determined to be within a prescribed acceptable range for the mobile router 16. In particular, a given mobile router 16 may be optimized for prescribed operations; for example, a wireless backbone router may be optimized to operate as a relay in a mesh network, and hence may be configured for a depth range of 2 to 5 hops, whereas distribution routers may be optimized for operating at 5 to 9 hops from the clusterhead and closer to the end nodes of the network. If in step 50 the attachment resource 24 determines that the advertised depth is outside the acceptable range of the mobile router, the attachment resource 24 discards the router advertisement message in step 52.

If, however, the attachment resource 24 determines that the advertised depth is within the acceptable range of the mobile router, the attachment resource 24 attaches to the parent router (i.e., the attachment router) by storing in step 53 the default route adjacency entry 40 (e.g., 40e). As illustrated in further detail in FIG. 4, each default route adjacency entry 40 includes a path identifier 60, namely the attachment address, for reaching the corresponding attachment router (identified by its address prefix 62), an optional link identifier 64 that enables the mobile router to map each attachment address 60 to a corresponding data link 18 for the corresponding attachment router (identified by the corresponding address prefix 62); each default route adjacency entry 40 also specifies the corresponding cost 66 specifying the number of hops required to reach the clusterhead 16a.

Figure 4:
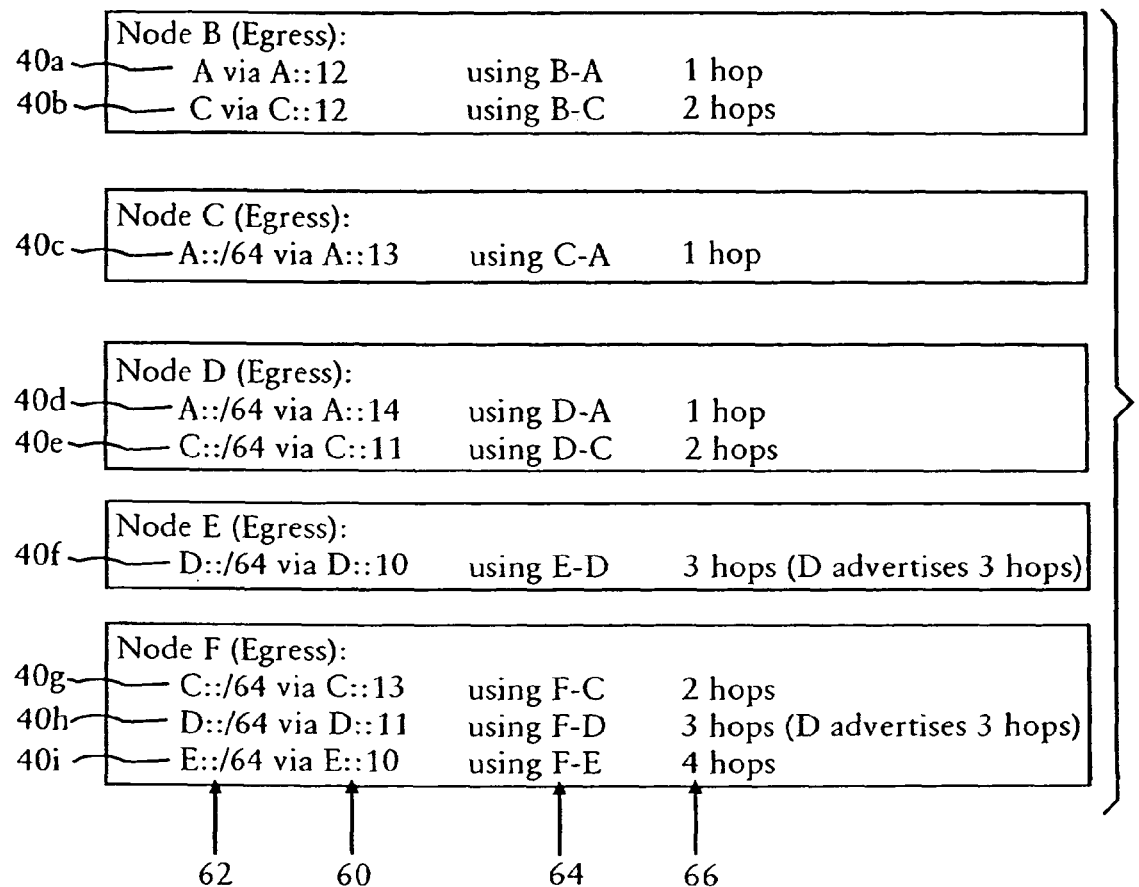
FIG. 4 is a diagram illustrating the routing table entries of the mobile routers of FIG. 1B that establish the directed acyclic graph of FIG. 1B.

In response to the attachment resource 24 updating the default route adjacency entry 40e in step 53, the neighbor advertisement resource 26 sends in step 54 an updated neighbor advertisement message 70, described below, to each parent router (i.e., attachment router) specified in the default route adjacency entries 40 of the routing table 32. The router advertisement resource 30 also selects in step 56 an advertisement depth (i.e., a depth to be advertised by the mobile router 16) based on adding a selected nonzero increment value to the maximum depth value specified among the default route adjacency entries 40d and 40e: as illustrated in FIG. 4, the router advertisement resource 30 for the mobile router 16d selects the maximum depth value of "2 hops" from the default route adjacency entry 40e, and adds a nonzero increment (e.g., 1 or more) for the selected depth in step 56. The advertisement resource 30 then advertises to other mobile routers 16 by outputting in step 58 a router advertisement message 68c specifying that the clusterhead is reachable via the router prefix "D::/64" 62 at an advertised cost 66 of 3 hops, as illustrated by entries 40f and 40h indicating that the mobile router 16d advertises 3 hops to the clusterhead.

Hence, the attachment resource 24 mobile router will establish concurrent attachments to respective attachment routers based on the respective advertisement messages (e.g., 68a, 68b) specifying the respective parent depths relative to the clusterhead. In addition, the router advertisement resource 30 of each mobile router 16 is configured for advertising reachability to the clusterhead 16a based on specifying within the router advertisement message 68c an advertised depth relative to the clusterhead. The "advertised depth" does not necessarily need to be the actual depth of the mobile router relative to the clusterhead, but rather can be greater than the actual depth of the mobile router in order to enable the mobile router to advertise a preferred position within the network topology.

Hence, as illustrated in FIG. 4, each of the mobile routers 16, upon having created at least one default route adjacency entry (40a and 40b in mobile router 16b, 40c in mobile router 16c, 40d and 40e in mobile router 16d, 40f in mobile router 16e, and 40g, 40h, and 40i in mobile router 16f), provides a path toward the clusterhead, such that each mobile router 16 provides a distributed entry 40 that enables formation of the directed acyclic graph 20 of FIG. 1B without any central management entity. In other words, the directed acyclic graph is formed based on the distributed and independent implementation of the above routing protocols by each of the mobile routers 16, where each mobile router 16 needs to store only the corresponding components 40 in formation of the DAG 20.

Figure 5:
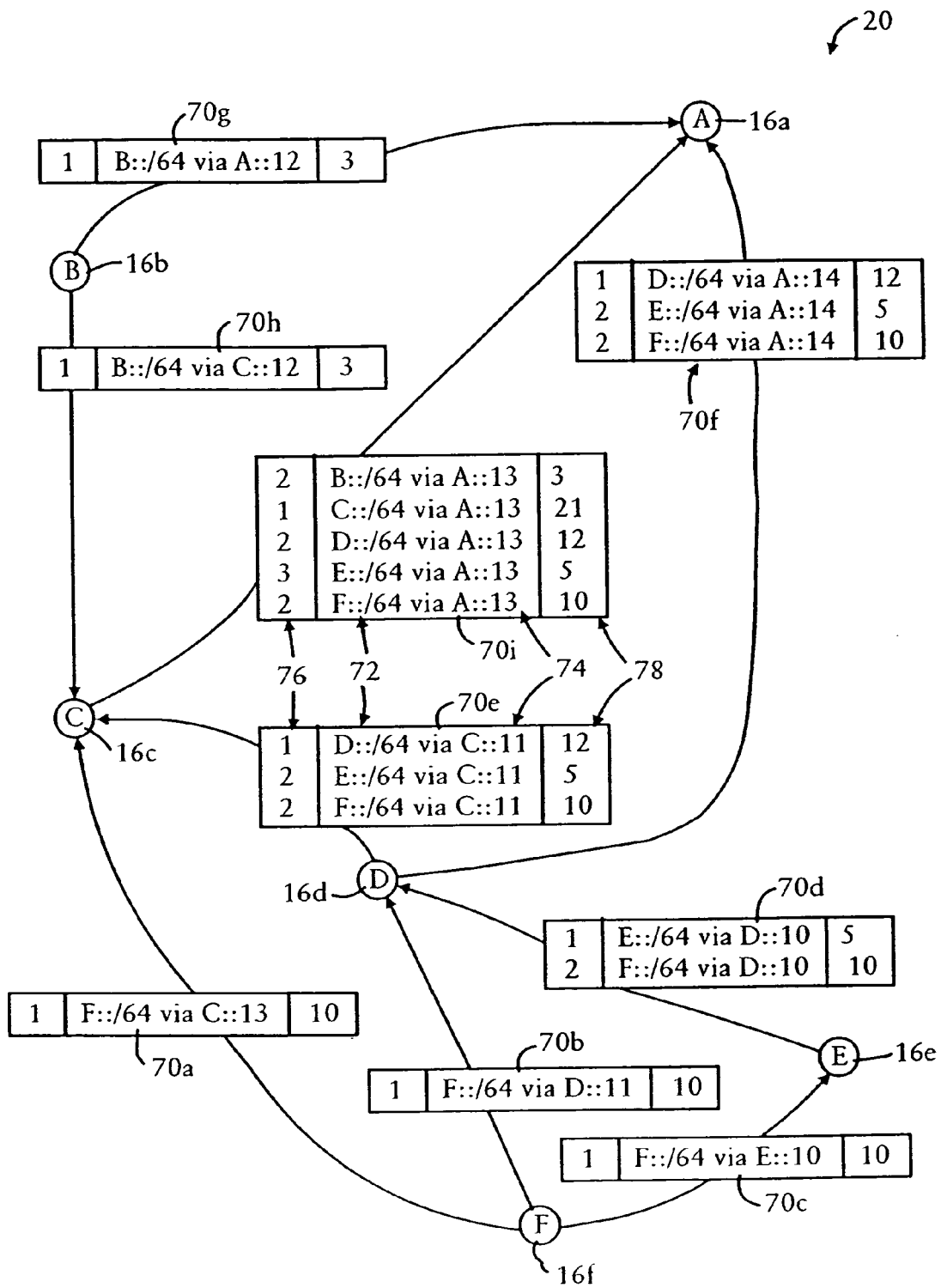
FIG. 5 is a diagram illustrating distribution of routing information toward the clusterhead using neighbor advertisement messages transmitted via multiple paths in the ad hoc network, according to an embodiment of the present invention.

FIG. 5 is a diagram illustrating distribution of neighbor advertisement messages 70 by the mobile routers 16 toward the clusterhead 16a, according to an embodiment of the present invention.

In particular, each of the attached mobile routers 16b, 16c, 16d, 16e, and 16f identify themselves to their attachment routers by sending neighbor advertisement messages 70 via their egress interfaces 36 and that specify a network-in-node option that a given network prefix 72 (i.e., a "reachable prefix") is reachable via a specified attachment address 74 at an advertised cost 76 (e.g., number of hops). Each neighbor advertisement message 70 also includes, for each specified prefix 72, a corresponding sequence identifier 78 that enables the parent router to validate whether the corresponding attachment address 74 and advertised cost 76 are valid entries relative to prior stored entries in the attachment router. In particular, since the disclosed embodiment is not limited to a tree topology as illustrated in FIG. 1A, a neighbor advertisement message can be received from different sources, creating the possibility that aged information can be propagated toward the clusterhead 16a.

Use of the sequence identifier 78 ensures that the parent routers can distinguish between new information and aged information in the neighbor advertisement messages 70. As described below, each parent router determines whether a received neighbor advertisement message 70 specifies a new entry or an aged entry based on the sequence identifier 78. Hence, received neighbor advertisement messages 70 specifying aged sequence identifiers 78 can be discarded as aged information being propagated by a subtree; however, new sequence identifiers 78 enable the parent router to create a new ingress table entry 80, illustrated in FIGS. 2 and 7, that specifies the new routing information, and propagate the new routing information toward the clusterhead in a new neighbor advertisement message 70. As described in detail below, the routing resource 34 in each of the mobile routers 16 is configured for routing any packet specifying an unknown destination to its attachment routers; hence, the packet is routed toward the clusterhead 16a until a mobile router can identify the destination address relative to an identified network prefix 72.

Hence, the disclosed embodiment provides an efficient proactive routing protocol for ad hoc networks that minimizes the necessity of bandwidth and processing requirements to accommodate rapid topology changes by providing rapid convergence. Hence, the disclosed embodiment provides a LORA type routing protocol even more efficient than the above-described STAR protocol, while accommodating multiple concurrent attachments by mobile routers to multiple parents, as illustrated by the DAG 20.

Figure 6:
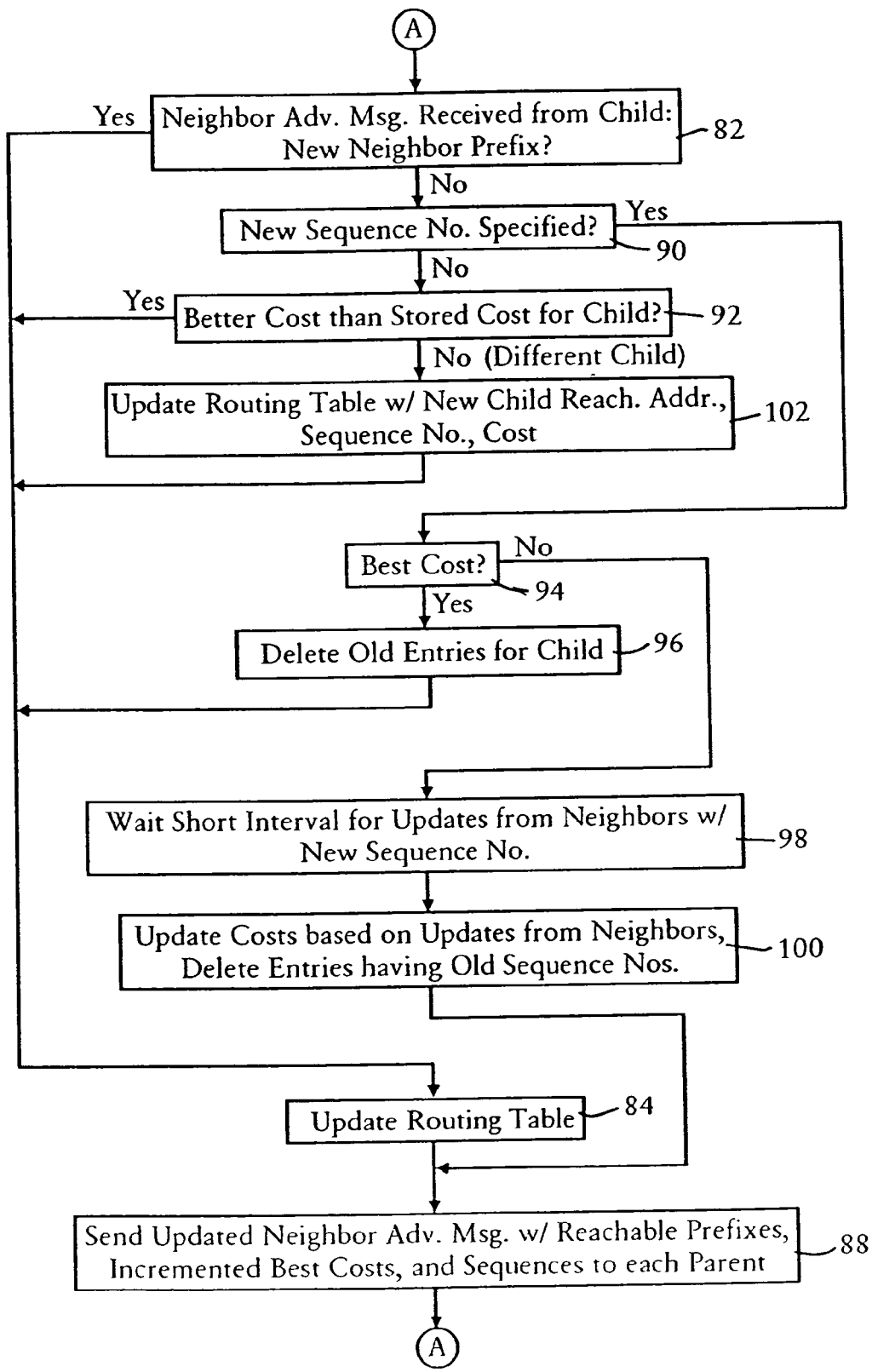
FIG. 6 is a diagram illustrating the method in each mobile router of sending a neighbor advertisement message to each attachment router, according to an embodiment of the present invention.

FIG. 6 is a diagram illustrating the method by the neighbor discovery resource 28 in each of the mobile routers 16 of selectively adding ingress table entries 80 to the routing table 32, and the neighbor advertisement resource 26 in each of the mobile routers 16 of outputting the neighbor advertisement message 70 to each of its parent routers based on the contents of the ingress table entries 80, according to an embodiment of the present invention.

The method begins in step 82, where the neighbor discovery resource 28 parses a received neighbor advertisement message 70 having been received from a child router (i.e., an attached mobile router) to determine whether the message 70 specifies a new neighbor prefix. For example, assume the neighbor discovery resource 28 of the mobile router 16*d* receives and parses the neighbor advertisement message 70*b* of FIG. 5 from the attached mobile router 16*f*. Assuming there are no prior ingress table entries 80 in the mobile router 16*d* specifying the network prefix "F::/64" 72 used by the mobile router 16*f*, the neighbor discovery resource 28 adds in step 84 a new ingress table entry 80*b*, illustrated in FIGS. 2 and 7, specifying that the reachable prefix "F::/64" 72 specified in the neighbor advertisement message 70*b* is reachable via the attachment address "D::11" 74 at an advertised cost 76 of 1 hop, and corresponding to the sequence identifier 78 having a value of "10" for the prefix "F::/64". The entry 80*b* also specifies that the attachment address "D::11" 74 is accessed via link identifier "D-F" 86.

As described above with respect to step 54 of FIG. 3, each update of the routing table 32, by either an egress entry 40 or an ingress entry 80, causes the neighbor advertisement resource 26 to send a new neighbor advertisement message 70; hence, the neighbor advertisement resource 26 sends in step 86 an updated neighbor advertisement message 70 to each parent router, specifying each of the reachable prefixes 72 in the ingress table entries 80 and the default prefix (e.g., "D::/64"), their incremented costs 76, and their respective prefixes 78.

Assume now in step 82 that the mobile router 16*d* receives the neighbor discovery message 70*d*, which specifies the prefix "E::/64" used by the mobile router 16*e*, but also the prefix "F::/64" based on the mobile router 16*e* having received the neighbor advertisement message 70*c*. In this case, all the neighbor advertisement messages 70*a*, 70*b*, and 70*c* from the neighbor advertisement resource 26 of the mobile router 16*f* each specify the same sequence number "10", indicating that each of the neighbor advertisement messages 70*a*, 70*b*, and 70*c* were generated at the same time (i.e., based on the same event).

Hence, the neighbor discovery resource 28 of the mobile router 16*d*, in response to detecting the neighbor advertisement message 70*d*, updates the routing table for the prefix "E::/64" as described above with respect to step 84 by adding an ingress table entry 80*a*.

Regarding the prefix "F::/64" in the neighbor advertisement message 70*d*, the neighbor discovery resource 28 in the mobile router 16*d* determines in step 90 whether a newer sequence number is specified (note that any advertisements specifying older sequence numbers are obsolete and therefore discarded). Assuming a new sequence number 78 was specified for an existing prefix 72, if the neighbor discovery resource 28 determines in step 94 that the message 70 specifying the new sequence number 78 also has the best cost relative to any stored entries 80, the neighbor discovery resource 28 deletes the aged entries 80 for reaching the specified prefix via the corresponding child identifier 74 in step 96, and updates the appropriate ingress routing table 80 in step 84 to include the new reachability information.

However if in step 94 the neighbor advertisement message 70 specifies a previously-stored prefix 72 with a new sequence number 78, but at a worse cost 78 then an existing stored entry for reaching the prefix 72 via the corresponding child 74, the neighbor discovery resource 28 waits in step 98 a short interval (e.g., 50 milliseconds) in an attempt to collect additional neighbor advertisement messages 70 from the child routers. This wait interval in step 98 ensures that any new neighbor advertisement messages 70 that need to be generated in response to a topology change among the child routers in the subtree have sufficient time to be received by the neighbor discovery resource 28 in the parent router. After the wait interval in step 98, the neighbor discovery resource 28 determines in step 100 the best advertised cost for reaching a given prefix 72 via a given child router 74, and adds the best advertised cost as a table entry 80. The neighbor discovery resource 28 also deletes in step 100 any entry 80 that still specifies an aged sequence number.

Referring again to step 90 of FIG. 6, in the example illustrated in FIG. 5, both the neighbor advertisement message 70*d* and the stored ingress table entry 80*b* specify the same sequence identifier 78 (Seq=10), indicating that the routing information related to the prefix "F::/64" in the neighbor advertisement messages 70*b* and 70*d* are based on the same event; hence, the neighbor discovery resource 28 of the mobile router 16*d* is able to validate the routing information for the prefix "F::/64" in the neighbor advertisement message 70*d* as a valid alternative path for reaching the advertised prefix "F::/64".

Upon validating the routing information for the prefix "F::/64" in the neighbor advertisement message 70*d*, and assuming that a new sequence number 78 is not specified, the neighbor discovery resource 28 determines in step 92 whether the neighbor advertisement message 70*d* specifies a better cost 76 than a prior stored cost in an ingress table entry 80 for reaching the specified prefix via the corresponding attached router (i.e., child router); in other words, a parent router may receive more than one neighbor advertisement message 70 from a given child router for the same prefix: normally the newest neighbor advertisement message 70 (as identified by the sequence number 78) has the best metric, which is stored as an ingress table entry 80 as the cost 76 of reaching the specified prefix 72 via the corresponding child router 74. However, in some instances the child router for the specified prefix may specify an improved cost using the same sequence number 78, for example in the case of an intervening router, between the child router and the originating router that utilizes the specified prefix, moving within the directed acyclic graph 20 to a position which is closer to the parent router. In this case, since the neighbor discovery resource 28 would determine that the neighbor advertisement message in step 92 would specify a better cost than the stored cost for the identified prefix via the child router, the neighbor discovery resource 28 would overwrite the corresponding child router entry 80 to specify that the specified prefix is reachable via the specified child router at the improved cost.

Hence, the neighbor discovery resource 28 is able to accommodate changes in its subnetwork topology that are not detected by the mobile router having originated the first neighbor advertisement message 70.

Figure 7:
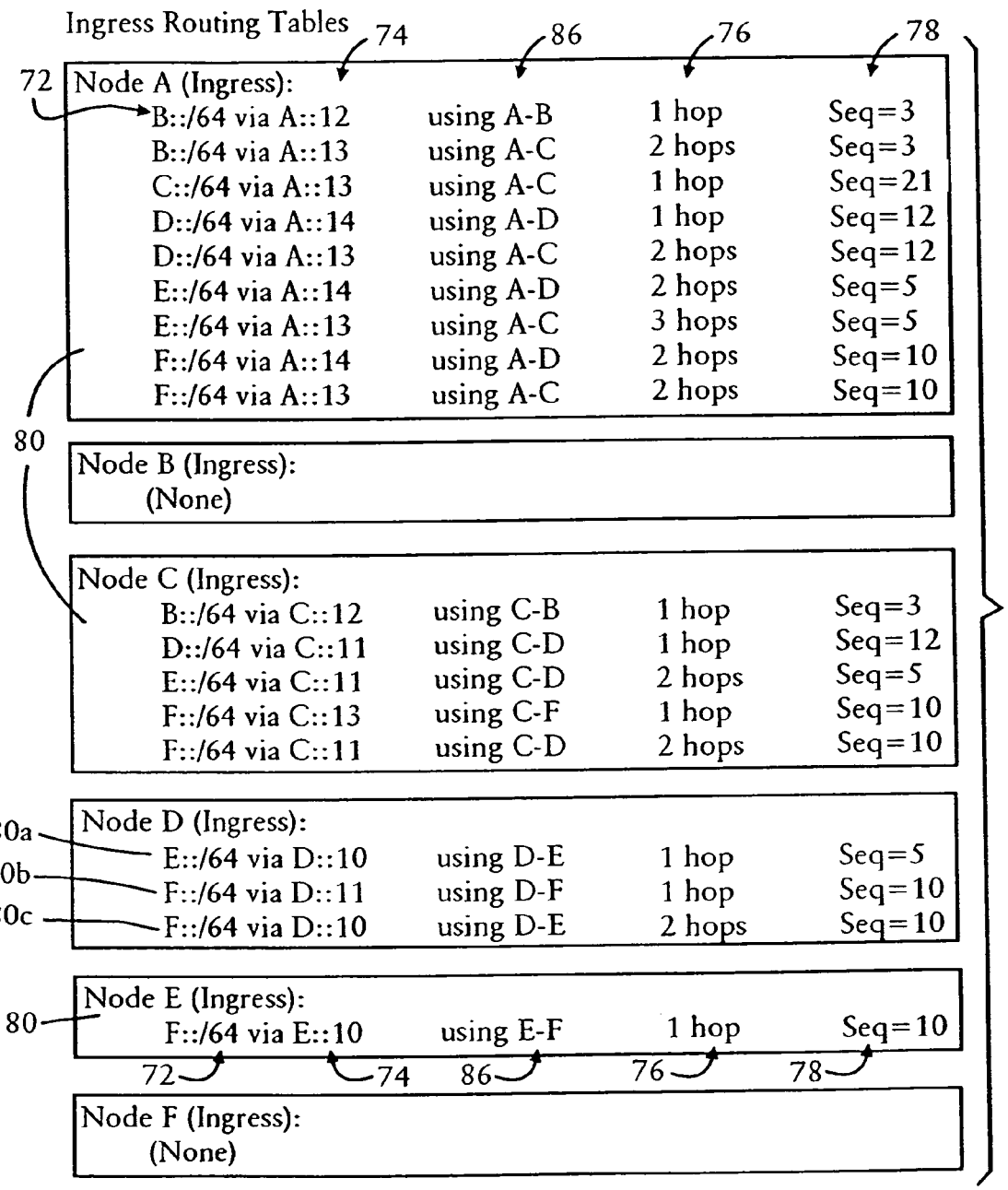
FIG. 7 is a diagram illustrating the routing table entries of the mobile routers of FIG. 1B that enable the attachment routers to reach the attached mobile routers, according to an embodiment of the present invention.

If in step 92 the neighbor discovery resource 28 determines that the neighbor advertisement message 70 specifies the same sequence number (e.g., "10") 78 for a given prefix (e.g., "F::/64") 72, but specifies a different child router (e.g., "D::10") 74, as illustrated by the mobile router 16*d* of FIG. 5 receiving the neighbor advertisement message 70*d*, the neighbor discovery resource 28 updates in step 102 the routing table 32 by adding an ingress table entry 80*c*, illustrated in FIG. 7. An updated neighbor advertisement message 70*e* is thus output by the neighbor advertisement resource 26 in step 88: the neighbor advertisement message 70*e* specifies the reachable prefixes 72, namely the native prefix "D::/64", and the reachable prefixes stored in the ingress table entries 80 (e.g., "E::/64" and "F::/64"); the neighbor advertisement resource 26 in step 88 also determines the best costs (i.e., minimum costs) from the ingress table entries 80 (e.g., 1 hop for "E::/64" and 1 hop for "F::/64"), and increments the minimum costs by one to obtain a new advertised cost for the neighbor advertisement message 70*e*. Also note that the neighbor advertisement resource 26 preserves the sequence number 78 for each corresponding prefix 72, enabling parent routers (e.g., 16*c*) to validate the routing information that may be received via alternative paths (e.g., neighbor advertisement message 70*a*).

Hence, each of the mobile routers 16 selectively adds or updates an ingress routing table entry 80 in response to received neighbor advertisement messages 70 based on the sequence number 78 and the associated costs 76, and also in response generates a new neighbor advertisement message 70 that includes the best costs for the reachable prefixes specified in the ingress router table entries 80, incremented by one to accommodate for the next hop. As illustrated in FIGS. 5 and 7, each of the parent routers toward the clusterhead are able to obtain routing information for all of the prefixes that are reachable via the attached routers: the mobile router 16*d* is able to create ingress table entries 80*a* and 80*c* for the respective prefixes "E::/64" and "F::/64" 72 in response to the message 70*d*, plus a second entry 80*b* for the prefix "F::/64" 72 in response to the message 70*b*; and the mobile router 16*c* is able to create ingress table entries 80 for the prefix "B::/64" 72 from message 70*h* and prefixes "D::/64", "E::/64", and "F::/64" from message 70*e*, plus a second entry 80 for the prefix "F::/64" based on the message 70*a*.

Finally, the clusterhead 16*a* is able to create ingress table entries 80 for the prefixes "B::/64", "C::/64", "D::/64", "E::/64", and "F::/64" 72 from message 70*i*, plus a second entry 80 for the prefix "B::/64" based on the message 70*g*, plus additional second entries 80 for prefixes "D::/64", "E::/64", and "F::/64" 72 from message 70*f*. Hence, each of the attachment routers 16*a*, 16*b*, 16*c*, 16*d*, and 16*e* are able to obtain routing information for the reachable prefix "F::/64" of the furthest child router 16*f*, plus any intervening prefixes "B::/64", "C::/64", "D::/64", "E::/64", and "F::/64". Moreover, each of the attachment routers can utilize available multiple paths, consistent with the DAG 20 of FIG. 1B, enabling data from the clusterhead 16*a* to the end child routers 16*b* or 16*f* to be transferred via the ad hoc network according to the reverse graph 22 of FIG. 1C.

According to the disclosed embodiment, mobile routers can operate independently to form a directed acyclic graph toward a clusterhead within a mobile ad hoc network, without the necessity of centralized topology management or additional network-management messages other than unsolicited router advertisement messages by attachment routers (i.e., parent routers) and neighbor advertisement messages by attached routers (i.e., child routers). Hence, multiple concurrent paths can be established between a child router and the clusterhead, resulting in a more stable communications between endpoints despite link fluctuations within the layer to mesh network. Further, the distribution of routing information throughout the directed acyclic graph enables a mobile router to determine whether a given packet should be routed on an identified ingress port or an identified egress port, eliminating the necessity of broadcasting packets to neighboring nodes that will only drop the packet; hence, unnecessary packet traffic in the ad hoc network is further minimized. Rather, load balancing can be applied to distribute data traffic across multiple links.

While the disclosed embodiment has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a mobile router configured for establishing communications within an ad hoc network, the method including:

establishing concurrent attachments by the mobile router to respective attachment routers based on having received respective advertisement messages specifying respective parent depths relative to a single clusterhead of the ad hoc network;

selecting by the mobile router an advertised depth relative to the single clusterhead based on adding a prescribed increment to a maximum one of the parent depths, and advertising reachability by the mobile router to reach the single clusterhead based on the mobile router outputting a router advertisement message specifying the advertised depth relative to the single clusterhead, enabling the mobile router to position itself within a directed acyclic graph directed toward the single clusterhead based on the mobile router providing the directed acyclic graph with concurrent paths toward the single clusterhead using the respective concurrent attachments.

2. The method of claim 1, wherein the establishing includes adding, to a routing table, a first routing table entry for each attachment router and that specifies a corresponding identifier for reaching the corresponding attachment router, and that specifies the corresponding parent depth.

3. The method of claim 2, wherein each identifier is a corresponding selected attachment address used by the mobile router for attachment to the corresponding attachment router, the attachment address within a range of a corresponding address prefix having been advertised within the corresponding advertisement message.

4. The method of claim 3, wherein each identifier is mapped by the mobile router to a corresponding data link to the corresponding attachment router.

5. The method of claim 2, further comprising:

sending, to each of the attachment routers and in response to having established each corresponding attachment, a first neighbor advertisement message specifying a first reachable prefix advertised by the mobile router in the router advertisement message, a corresponding cost for reaching the first reachable prefix, and a corresponding sequence identifier that enables validation of the corresponding first reachable prefix relative to any stored router entries in the attachment routers.

6. The method of claim 5, further comprising:

receiving a second neighbor advertisement message from an attached mobile router having attached to the mobile router, the second neighbor advertisement message specifying at least one second reachable prefix that is reachable via the attached mobile router, a corresponding advertised cost for reaching the at least one second reachable prefix via the attached mobile router, and a corresponding advertised sequence identifier; and selectively adding the at least one second reachable prefix, the corresponding advertised cost, and the corresponding advertised sequence identifier to the routing table based on at least one of: (1) determining the advertised sequence identifier identifying the second neighbor advertisement message does not specify an older advertisement of the at least one second reachable prefix relative to any corresponding stored sequence identifiers stored in the routing table for the at least one second reachable prefix, and (2) determining the advertised cost is less than any corresponding stored cost stored in the routing table for the at least one second reachable prefix; the sending including:

(1) incrementing a minimum of said stored costs corresponding to the sequence identifier identifying a most recent advertisement of the at least one second reachable prefix, and (2) adding the at least one second reachable prefix, the increment of the minimum of the corresponding stored costs, and the corresponding sequence identifier to the first neighbor advertisement message.

7. The method of claim 6, further comprising receiving a third neighbor advertisement message from a second attached mobile router having attached to the mobile router, the third neighbor advertisement message specifying the at least one second reachable prefix that is reachable via the second attached mobile router, a corresponding advertised cost for reaching the at least one second reachable prefix via the second attached mobile router, and a corresponding advertised sequence identifier;

selectively updating the routing table to specify that the at least one second reachable prefix is reachable via the second attached mobile router at the corresponding advertised cost relative to the corresponding advertised sequence identifier;

outputting an updated first neighbor advertisement message specifying that the at least one second reachable prefix is reachable via the mobile router at the increment of the minimum of the corresponding stored costs, relative to the corresponding advertised sequence identifier.

8. The method of claim 1, wherein the establishing includes selecting each one of the attachment routers based on the corresponding advertised depth determined to be within a prescribed acceptable range.

9. The method of claim 1, further comprising sending, to each of the attachment routers, a neighbor advertisement message specifying at least one reachable prefix that is reachable by the mobile router, a corresponding cost for reaching at least one reachable prefix by the mobile router, and a corresponding sequence identifier that enables validation of the corresponding at least one reachable prefix relative to any stored router entries in the attachment routers.

10. A mobile router configured for establishing communications within an ad hoc network, the mobile router comprising:

an attachment resource configured for establishing concurrent attachments to respective attachment routers based on the mobile router having received respective advertisement messages specifying respective parent depths relative to a single clusterhead of the ad hoc network; and a router advertisement resource configured for advertising reachability to reach the single clusterhead based on outputting a router advertisement message specifying an advertised depth relative to the single clusterhead, the router advertisement resource configured for selecting the advertised depth relative to the single clusterhead based on adding a prescribed increment to a maximum one of the parent depths, enabling the mobile router to position itself within a directed acyclic graph directed toward the single clusterhead based on the mobile router providing the directed acyclic graph with concurrent paths toward the single clusterhead using the respective concurrent attachments.

11. The mobile router of claim 10, further comprising a routing table configured for storing routing table entries, the attachment resource configured for adding, to the routing table, a first routing table entry for each attachment router and that specifies a corresponding identifier for reaching the corresponding attachment router, and that specifies the corresponding parent depth.

12. The mobile router of claim 11, wherein each identifier is a corresponding selected attachment address used by the mobile router for attachment to the corresponding attachment router, the attachment address within a range of a corresponding address prefix having been advertised within the corresponding advertisement message.

13. The mobile router of claim 12, wherein the mobile router is configured for mapping each identifier to a corresponding data link to the corresponding attachment router.

14. The mobile router of claim 11, further comprising:

a neighbor advertisement resource configured for sending, to each of the attachment routers and in response to the attachment resource having established each corresponding attachment, a first neighbor advertisement message specifying a first reachable prefix advertised by the mobile router in the router advertisement message, a corresponding cost for reaching the first reachable prefix, and a corresponding sequence identifier that enables validation of the corresponding first reachable prefix relative to any stored router entries in the attachment routers.

15. The mobile router of claim 14, further comprising:

a neighbor discovery resource configured for parsing a second neighbor advertisement message having been received from an attached mobile router having attached to the mobile router, the second neighbor advertisement message specifying at least one second reachable prefix that is reachable via the attached mobile router, a corresponding advertised cost for reaching the at least one second reachable prefix via the attached mobile router, and a corresponding advertised sequence identifier;

the neighbor discovery resource selectively adding the at least one second reachable prefix, the corresponding advertised cost, and the corresponding advertised sequence identifier to the routing table based on at least one of: (1) determining the advertised sequence identifier identifying the second neighbor advertisement message does not specify an older advertisement of the at least one second reachable prefix relative to any corresponding stored sequence identifiers stored in the routing table for the at least one second reachable prefix, and (2) determining the advertised cost is less than any corresponding stored cost stored in the routing table for the at least one second reachable prefix;

the neighbor advertisement resource configured for sending the first neighbor advertisement message based on:

(1) incrementing a minimum of said stored costs corresponding to the sequence identifier identifying a most recent advertisement of the at least one second reachable prefix, and (2) adding the at least one second reachable prefix, the increment of the minimum of the corresponding stored costs, and the corresponding sequence identifier to the first neighbor advertisement message.

16. The mobile router of claim 15, wherein:

the neighbor discovery resource is configured for parsing a third neighbor advertisement message received from a second attached mobile router having attached to the mobile router, the third neighbor advertisement message specifying the at least one second reachable prefix that is reachable via the second attached mobile router, a corresponding advertised cost for reaching the at least one second reachable prefix via the second attached mobile router, and a corresponding advertised sequence identifier;

the neighbor discovery resource configured for selectively updating the routing table to specify that the at least one second reachable prefix is reachable via the second attached mobile router at the corresponding advertised cost relative to the corresponding advertised sequence identifier;

the neighbor advertisement resource configured for outputting an updated first neighbor advertisement message specifying that the at least one second reachable prefix is reachable via the mobile router at the increment of the minimum of the corresponding stored costs, relative to the corresponding advertised sequence identifier.

17. The mobile router of claim 10, wherein the establishing includes selecting each one of the attachment routers based on the corresponding advertised depth determined to be within a prescribed acceptable range.

18. The mobile router of claim 10, further comprising a neighbor advertisement resource configured for sending, to each of the attachment routers, a neighbor advertisement message specifying at least one reachable prefix that is reachable by the mobile router, a corresponding cost for reaching at least one reachable prefix by the mobile router, and a corresponding sequence identifier that enables validation of the corresponding at least one reachable prefix relative to any stored router entries in the attachment routers.

19. An ad hoc network comprising:

a plurality of mobile routers having organized into a directed acyclic graph directed toward a single clusterhead, one of the mobile routers serving as the single clusterhead, the directed acyclic graph having attached mobile routers that have attached to attachment routers, each mobile router including:

an attachment resource configured for selectively establishing concurrent attachments, as an attached mobile router, to selected attachment routers from the attachment routers based on the mobile router having received respective advertisement messages from the selected attachment routers, the advertisement messages specifying respective parent depths relative to the single clusterhead of the ad hoc network, and a router advertisement resource configured for advertising reachability to reach the single clusterhead based on outputting a router advertisement message specifying an advertised depth relative to the single clusterhead, the router advertisement resource configured for selecting the advertised depth relative to the single clusterhead based on adding a prescribed increment to a maximum one of the parent depths, enabling the mobile router to position itself within the directed acyclic graph directed toward the single clusterhead based on the mobile router providing the directed acyclic graph with concurrent paths toward the single clusterhead using the respective concurrent attachments.

20. The network of claim 19, wherein each mobile router further comprises a routing table configured for storing routing table entries, the attachment resource configured for adding, to the routing table, a first routing table entry for each selected attachment router and that specifies a corresponding identifier for reaching the corresponding selected attachment router, and that specifies the corresponding parent depth.

21. The network of claim 20, wherein each identifier is a corresponding selected attachment address used by the mobile router for attachment to the corresponding selected attachment router, the attachment address within a range of a corresponding address prefix having been advertised within the corresponding advertisement message.

22. The network of claim 21, wherein each mobile router is configured for mapping each identifier to a corresponding data link to the corresponding selected attachment router.

23. The network of claim 20, wherein each mobile router further comprises:

a neighbor advertisement resource configured for sending, to each of the selected attachment routers and in response to the attachment resource having established each corresponding attachment, a first neighbor advertisement message specifying a first reachable prefix advertised by the mobile router in the router advertisement message, a corresponding cost for reaching the first reachable prefix, and a corresponding sequence identifier that enables validation of the corresponding first reachable prefix relative to any stored router entries in the selected attachment routers.

24. The network of claim 23, wherein each mobile router further comprises:

a neighbor discovery resource configured for parsing a second neighbor advertisement message having been received from an attached mobile router having attached to the mobile router, the second neighbor advertisement message specifying at least one second reachable prefix that is reachable via the attached mobile router, a corresponding advertised cost for reaching the at least one second reachable prefix via the attached mobile router, and a corresponding advertised sequence identifier;

the neighbor discovery resource selectively adding the at least one second reachable prefix, the corresponding advertised cost, and the corresponding advertised sequence identifier to the routing table based on at least one of: (1) determining the advertised sequence identifier identifying the second neighbor advertisement message does not specify an older advertisement of the at least one second reachable prefix relative to any corresponding stored sequence identifiers stored in the routing table for the at least one second reachable prefix, and (2) determining the advertised cost is less than any corresponding stored cost stored in the routing table for the at least one second reachable prefix;

the neighbor advertisement resource configured for sending the first neighbor advertisement message based on:

(1) incrementing a minimum of said stored costs corresponding to the sequence identifier identifying a most recent advertisement of the at least one second reachable prefix, and (2) adding the at least one second reachable prefix, the increment of the minimum of the corresponding stored costs, and the corresponding sequence identifier to the first neighbor advertisement message.

25. The network of claim 24, wherein:
the neighbor discovery resource of each mobile router is configured for parsing a third neighbor advertisement message received from a second attached mobile router having attached to said each mobile router, the third neighbor advertisement message specifying the at least one second reachable prefix that is reachable via the second attached mobile router, a corresponding advertised cost for reaching the at least one second reachable prefix via the second attached mobile router, and a corresponding advertised sequence identifier;
the neighbor discovery resource of said each mobile router configured for selectively updating the routing table to specify that the at least one second reachable prefix is reachable via the second attached mobile router at the corresponding advertised cost relative to the corresponding advertised sequence identifier;
the neighbor advertisement resource of said each mobile router is configured for outputting an updated first neighbor advertisement message specifying that the at least one second reachable prefix is reachable via the mobile router at the increment of the minimum of the corresponding stored costs, relative to the corresponding advertised sequence identifier.

26. The network of claim 19, wherein the attachment resource is configured for selecting each one of the selected attachment routers based on the corresponding advertised depth determined to be within a prescribed acceptable range.

27. The network of claim 19, wherein each mobile router further comprising a neighbor advertisement resource configured for sending, to each of the selected attachment routers, a neighbor advertisement message specifying at least one reachable prefix that is reachable by the mobile router, a corresponding cost for reaching at least one reachable prefix by the mobile router, and a corresponding sequence identifier that enables validation of the corresponding at least one reachable prefix relative to any stored router entries in the attachment routers.

28. A mobile router configured for establishing communications within an ad hoc network, the mobile router comprising:
means for establishing concurrent attachments to respective attachment routers based on having received respective advertisement messages specifying respective parent depths relative to a single clusterhead of the ad hoc network; and
means for advertising reachability to reach the single clusterhead based on outputting a router advertisement message specifying an advertised depth relative to the single clusterhead, the means for advertising configured for selecting the advertised depth relative to the single clusterhead based on adding a prescribed increment to a maximum one of the parent depths, enabling the mobile router to position itself within a directed acyclic graph directed toward the single clusterhead based on the mobile router providing the directed acyclic graph with concurrent paths toward the single clusterhead using the respective concurrent attachments.

29. The mobile router of claim 28, further comprising means for storing routing table entries, the means for establishing configured for adding, to the means for storing, a first entry for each attachment router and that specifies a corresponding identifier for reaching the corresponding attachment router, and that specifies the corresponding parent depth.

30. The mobile router of claim 29, wherein each identifier is a corresponding selected attachment address used by the mobile router for attachment to the corresponding attachment router, the attachment address within a range of a corresponding address prefix having been advertised within the corresponding advertisement message.

31. The mobile router of claim 30, wherein the mobile router is configured for mapping each identifier to a corresponding data link to the corresponding attachment router.

32. The mobile router of claim 29, further comprising:
means for sending, to each of the attachment routers and in response to the attachment resource having established each corresponding attachment, a first neighbor advertisement message specifying a first reachable prefix advertised by the mobile router in the router advertisement message, a corresponding cost for reaching the first reachable prefix, and a corresponding sequence identifier that enables validation of the corresponding first reachable prefix relative to any stored router entries in the attachment routers.

33. The mobile router of claim 32, further comprising:
discovery means for parsing a second neighbor advertisement message having been received from an attached mobile router having attached to the mobile router, the second neighbor advertisement message specifying at least one second reachable prefix that is reachable via the attached mobile router, a corresponding advertised cost for reaching the at least one second reachable prefix via the attached mobile router, and a corresponding advertised sequence identifier;
the discovery means configured for selectively adding the at least one second reachable prefix, the corresponding advertised cost, and the corresponding advertised sequence identifier to the means for storing based on at least one of: (1) determining the advertised sequence identifier identifying the second neighbor advertisement message does not specify an older advertisement of the at least one second reachable prefix relative to any corresponding stored sequence identifiers stored in the routing table for the at least one second reachable prefix, and (2) determining the advertised cost is less than any corresponding stored cost stored in the routing table for the at least one second reachable prefix;
the means for sending configured for sending the first neighbor advertisement message based on:
(1) incrementing a minimum of said stored costs corresponding to the sequence identifier identifying a most recent advertisement of the at least one second reachable prefix, and
(2) adding the at least one second reachable prefix, the increment of the minimum of the corresponding stored costs, and the corresponding sequence identifier to the first neighbor advertisement message.

34. The mobile router of claim 32, wherein:
the discovery means is configured for parsing a third neighbor advertisement message received from a second attached mobile router having attached to the mobile router, the third neighbor advertisement message specifying the at least one second reachable prefix that is reachable via the second attached mobile router, a corresponding advertised cost for reaching the at least one second reachable prefix via the second attached mobile router, and a corresponding advertised sequence identifier;
the discovery means configured for selectively updating the means for storing to specify that the at least one second reachable prefix is reachable via the second attached mobile router at the corresponding advertised cost relative to the corresponding advertised sequence identifier;
the means for sending configured for outputting an updated first neighbor advertisement message specifying that the at least one second reachable prefix is reachable via the mobile router at the increment of the minimum of the corresponding stored costs, relative to the corresponding advertised sequence identifier.

35. The mobile router of claim 28, wherein the means for establishing is configured for selecting each one of the attachment routers based on the corresponding advertised depth determined to be within a prescribed acceptable range.

36. The mobile router of claim 28, further comprising a means for sending, to each of the attachment routers, a neighbor advertisement message specifying at least one reachable prefix that is reachable by the mobile router, a corresponding cost for reaching at least one reachable prefix by the mobile router, and a corresponding sequence identifier that enables validation of the corresponding at least one reachable prefix relative to any stored router entries in the attachment routers.

37. A non-transitory computer readable medium having stored thereon sequences of instructions for a mobile router to establish communications within an ad hoc network, the sequences of instructions including instructions for:
   establishing concurrent attachments by the mobile router to respective attachment routers based on having received respective advertisement messages specifying respective parent depths relative to a single clusterhead of the ad hoc network;
   selecting by the mobile router an advertised depth relative to the single clusterhead based on adding a prescribed increment to a maximum one of the parent depths, and
   advertising reachability by the mobile router to reach the single clusterhead based on the mobile router outputting a router advertisement message specifying the advertised depth relative to the single clusterhead, enabling the mobile router to position itself within a directed acyclic graph directed toward the single clusterhead based on the mobile router providing the directed acyclic graph with concurrent paths toward the single clusterhead using the respective concurrent attachments.

38. The medium of claim 37, wherein the establishing includes adding, to a routing table, a first routing table entry for each attachment router and that specifies a corresponding identifier for reaching the corresponding attachment router, and that specifies the corresponding parent depth.

39. The medium of claim 38, wherein each identifier is a corresponding selected attachment address used by the mobile router for attachment to the corresponding attachment router, the attachment address within a range of a corresponding address prefix having been advertised within the corresponding advertisement message.

40. The medium of claim 39, wherein each identifier is mapped by the mobile router to a corresponding data link to the corresponding attachment router.

41. The medium of claim 38, further comprising instructions for:
   sending, to each of the attachment routers and in response to having established each corresponding attachment, a first neighbor advertisement message specifying a first reachable prefix advertised by the mobile router in the router advertisement message, a corresponding cost for reaching the first reachable prefix, and a corresponding sequence identifier that enables validation of the corresponding first reachable prefix relative to any stored router entries in the attachment routers.

42. The medium of claim 41, further comprising instructions for:
   receiving a second neighbor advertisement message from an attached mobile router having attached to the mobile router, the second neighbor advertisement message specifying at least one second reachable prefix that is reachable via the attached mobile router, a corresponding advertised cost for reaching the at least one second reachable prefix via the attached mobile router, and a corresponding advertised sequence identifier; and
   selectively adding the at least one second reachable prefix, the corresponding advertised cost, and the corresponding advertised sequence identifier to the routing table based on at least one of: (1) determining the advertised sequence identifier identifying the second neighbor advertisement message does not specify an older advertisement of the at least one second reachable prefix relative to any corresponding stored sequence identifiers stored in the routing table for the at least one second reachable prefix, and (2) determining the advertised cost is less than any corresponding stored cost stored in the routing table for the at least one second reachable prefix;
   the sending including:
   (1) incrementing a minimum of said stored costs corresponding to the sequence identifier identifying a most recent advertisement of the at least one second reachable prefix, and
   (2) adding the at least one second reachable prefix, the increment of the minimum of the corresponding stored costs, and the corresponding sequence identifier to the first neighbor advertisement message.

43. The medium of claim 42, further comprising instructions for:
   receiving a third neighbor advertisement message from a second attached mobile router having attached to the mobile router, the third neighbor advertisement message specifying the at least one second reachable prefix that is reachable via the second attached mobile router, a corresponding advertised cost for reaching the at least one second reachable prefix via the second attached mobile router, and a corresponding advertised sequence identifier;
   selectively updating the routing table to specify that the at least one second reachable prefix is reachable via the second attached mobile router at the corresponding advertised cost relative to the corresponding advertised sequence identifier;
   outputting an updated first neighbor advertisement message specifying that the at least one second reachable prefix is reachable via the mobile router at the increment of the minimum of the corresponding stored costs, relative to the corresponding advertised sequence identifier.

44. The medium of claim 37, wherein the establishing includes selecting each one of the attachment routers based on the corresponding advertised depth determined to be within a prescribed acceptable range.

45. The medium of claim 37, further comprising instructions for sending, to each of the attachment routers, a neighbor advertisement message specifying at least one reachable prefix that is reachable by the mobile router, a corresponding cost for reaching at least one reachable prefix by the mobile router, and a corresponding sequence identifier that enables validation of the corresponding at least one reachable prefix relative to any stored router entries in the attachment routers.

46. The method of claim 1, wherein the concurrent paths are unequal cost paths.

47. The mobile router of claim 10, wherein the concurrent paths are unequal cost paths.

48. The network of claim 19, wherein the concurrent paths are unequal cost paths.

49. The mobile router of claim 28, wherein the concurrent paths are unequal cost paths.

50. The medium of claim 37, wherein the concurrent paths are unequal cost paths.

* * * * *